July 2, 1957 R. D. UTHOFF 2,797,969
SEGMENTED BEARING RETAINER
Filed May 9, 1955
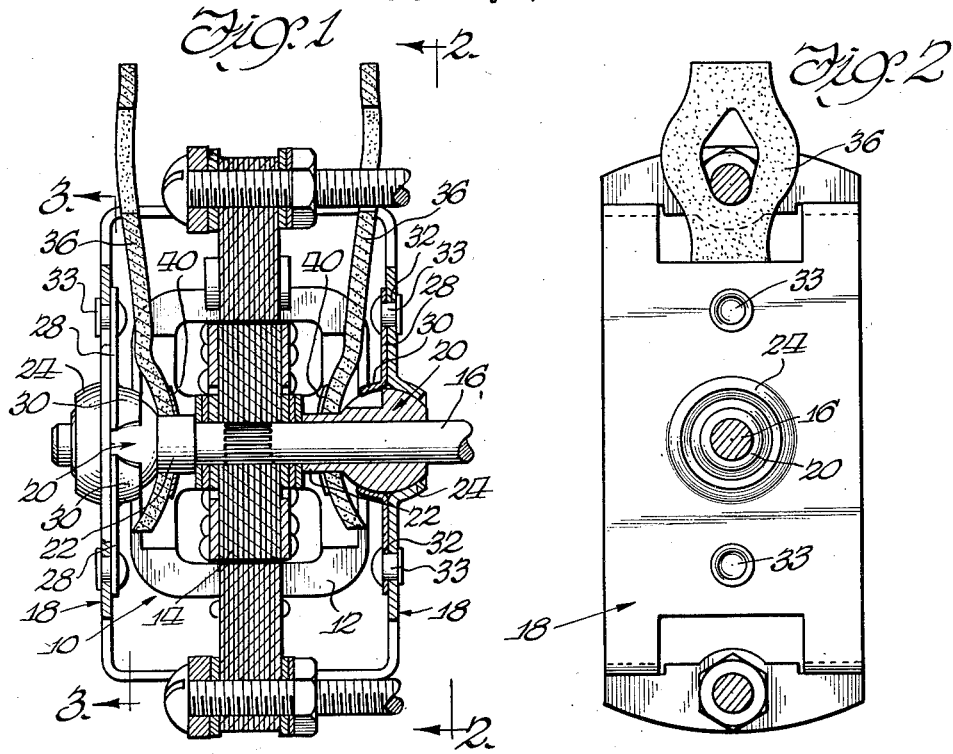
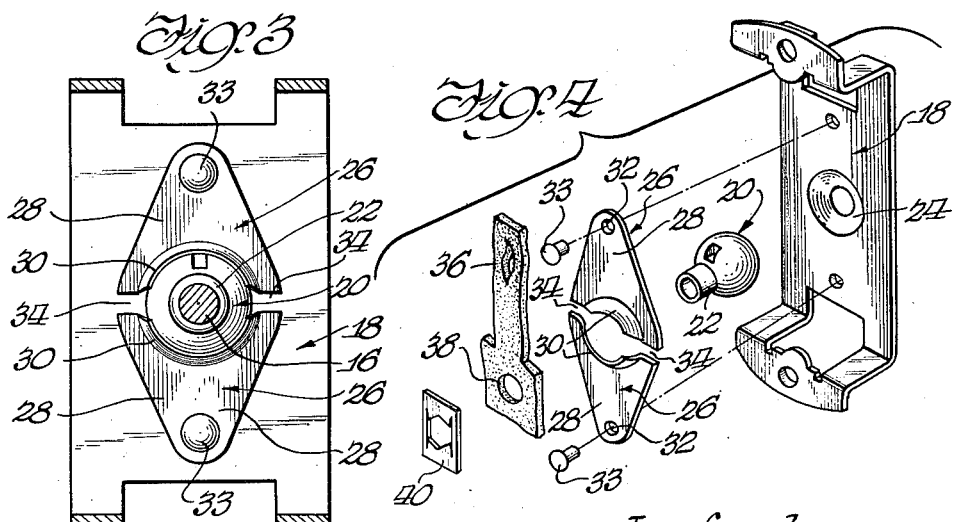
Inventor
Robert D. Uthoff
by Bair, Freeman & Molinare
Attorneys

2,797,969
Patented July 2, 1957

2,797,969
SEGMENTED BEARING RETAINER

Robert D. Uthoff, St. Louis, Mo., assignor to Knapp-Monarch Company, St. Louis, Mo., a corporation of Missouri Application May 9, 1955, Serial No. 506,739

6 Claims. (Cl. 308—72)

This invention relates to an improved bearing retainer and more particularly to a bearing retainer for use with self-aligning spherical bearings of the type used in small motors.

The torque characteristics of a motor are very important as far as functional performance of any motor is concerned. A constant and controlled torque in a motor means first of all that it will start reliably; secondly, it means that after the motor has been built into the appliance and properly aligned and tested, and then shipped to the distributor or customer, that the armature will have the same starting characteristics; third, it means that each motor will attain the same predictable running speed and, therefore, each motor will deliver its designed output power at all times; fourth, it means that the bearing will never be misaligned with respect to the shaft to the extent that there will be excessive heating or wear, either on the outside diameter on the shaft or on the inside diameter of the bearing; fifth, it means that the input power drawn by each motor of the same rating, will be very uniform, and by this is meant that there will not be the condition where one motor of a group will draw high current and its windings would, therefore, overheat, while the next motor in the same group will have a more free running rotor so that it would draw less current and operate with cooler windings.

For many years there has existed a serious problem in small, inexpensive, motors that use self-aligning bearings. This problem had to do with providing a proper bearing retainer which imposed a uniform tension on the bearing where it is held in place against the bearing bracket. In actual practice in the production of such motors, what actually resulted was a condition where motors of the same type would all vary, seriously, as far as starting torque, running torque, wear, and heat, were concerned.

In bearing retainer designs heretofore, two ends of the bearing retainer were generally held down with diametrically opposed rivets, and the height of the retainer, was accurately calculated and controlled so that the spherical radius at which the bearing retainer's bearing seat was located provided for just sufficient tension against the bearing itself. However, experience has shown that there are sufficient dimensional variations in the bearing retainer itself, and in other parts which comprise the bearing bracket assembly, such that the bearing assembly often is either too loose or it is too tight.

When the bearing assembly is too loose, the shaft will rotate freely but will cause a noisy running condition as the bearing rattles between its seat in the bearing bracket and its seat in the bearing retainer. When the bearing assembly is too tight, the bearing will not actually be self-aligning, and it will be turned at an angle with respect to the axial direction of the shaft, a condition which causes binding to varying degrees in different assemblies.

Thus, it is an object of this invention to provide an improved bearing assembly for use with motors wherein the aforementioned problems incident to obtaining uniformity in production have been substantially obviated.

Another object of this invention is to provide a novel and improved bearing retainer construction by means of which the aforementioned problems of loose bearings, or binding bearings, are substantially eliminated.

A further object of this invention is to provide a new and improved bearing assembly for motors in combination with improved means for lubricating the bearing.

Still another object of this invention is to provide a bearing assembly and novel bearing retainer therefor which is characterized by its simplicity and inexpensiveness of construction and by its efficiency in operation.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

Figure 1 is a cross-section view through a small electric motor that is equipped with the bearing assembly of this invention;

Figure 2 is another view of the motor taken on line 2—2, of Figure 1;

Figure 3 is a view of the improved bearing retainer and is taken on line 3—3 of Figure 1; and Figure 4 is an exploded perspective view of the improved bearing assembly and lubricating means therefor.

Referring now to the drawings, there is shown in Figure 1, a typical assembly wherein this invention may be used. In Figure 1, there is shown an electrical motor 10 including a stator 12, a rotor 14, a rotor shaft 16, and a pair of rotor bearing support brackets generally indicated at 18. The stator 12, rotor 14, and shaft 16 are of well known construction and form no part of this invention.

The rotor shaft 16 is shown mounted at its ends in a pair of self-aligning spherical bearings 20, each spherical bearing 20 including a tubular bearing sleeve portion 22 extending therefrom.

The support bracket 18 is provided with an outwardly dished portion 24 which serves as a spherical bearing seat for the spherical bearing 20.

The bearing retainer of this spherical bearing assembly is formed of a plurality of segments. In the specific embodiment shown, there are two bearing retaining segments 26. Each bearing retaining segment 26 includes a planar or flat portion 28 and a spherical bearing seat segment 30. The flat portion 28 is apertured at 32 to provide means for securing the bearing retaining segment 26 to the bracket 18 by means of a rivet or pin 33 or the like.

The single rivet 33 provides a single point of securement of the bearing retaining segment 26 to the bracket 18. The bearing retaining segment 26 is pivotable about the axis of rivet 33 to permit accommodation or relocation of the axis of the spherical bearing seat segment 30 with respect to the axis of the spherical bearing 20 with which said bearing seat segment is adapted to cooperate.

The spherical bearing segment 30 extends inwardly, or is oppositely facing with respect to the spherical bearing seat 24. The arcuate length of the bearing segment 30 is less than 180°. The arrangement of the bearing seat segments 30 is such that the plane of the flat portions 28 of the bearing retainer segments 26 is located between the bearing seat 24, in the bracket 18, and the segmented bearing seat formed by the segments 30.

The flat portions 28 of the bearing retaining segments 26 are arranged so that normally they do not lie immediately adjacent bracket 18, but, rather, the bearing retaining segments 26 are designed so that normally the bearing seat segments 30 engage the spherical bearing 20 so as to provide a cantilevered spring force developed in the bearing retainer segment 26. In other words, the bearing retainer segments 26, while being secured by the rivets 33 to the supporting structure including the bracket 18, are so designed and arranged that when spherical bearing seat segments 30 engage spherical bearing 20, there is some slight distortion of the bearing retainer segments 26 so that a spring-like retaining force is developed between the bearing seat segments 30 and the spherical bearing 20.

When the bearing retainer is properly assembled, there are open spaces 34 between the adjacent bearing seat segments 30. The bearing retainer assembly above described permits of a very simple assembly of a lubricating means in relation to the spherical bearing assembly. There is shown an oil bearing felt 36 that is perforated at 38 to permit fitting the felt 36 over the tubular bearing sleeve extension 22 of the spherical bearing 20. The spaces 34 between adjacent bearing seat segments 30 afford regions where there may be direct contact of the oil bearing felt 36 with exposed surfaces of the spherical bearing 20, thereby affording means for direct lubrication to the very parts of the bearing 20 which are subject to wear.

The oil bearing felt 36 may be very simply retained in position in oil dispensing relation to portions of the oil bearing assembly, by a snap ring or speed fastener 40, of a well known construction, which merely slips onto the tubular extension 22 and is frictionally retained in position by engagement with said tubular extension 22, and operates to keep, or force, felt 36 into good lubrication-applying relation to portions of the spherical bearing 20.

From the above description of the split bearing retainer design, it will be understood that the various segments 26 of the bearing retainer operate as cantilevered springs to bear against the spherical bearing 20 to maintain said bearing under proper spring tension in its bearing seat 24. Because of the fact that the retainer's bearing seat 30 is segmented, there is substantially eliminated the possibility of binding between said bearing retainer and the bearing 20, since each of the segments 30 develop its own bearing force against the bearing 20, independently of the other segments 30 of the segmented bearing seat.

Each bearing seat segment 30 is so arranged, relative to the sole point of securement of the bearing retainer segment 26 to the bracket 18 at the rivet 33, that portions of each said segment 30 engage said spherical bearing 20 on opposite sides of a plane which passes through the longitudinal axis of the bearing and through the axis of rivet 33. Such a plane as described would be the vertical plane, as viewed in Figure 3, which passes through the axes of the two rivets 33 and through the axis of the shaft 16. As seen in Figure 3, portions of both bearing seat segments 30 are then disposed both to the left and right of such a vertical plane. This latter arrangement provides that only the single point of connection at rivet 33 is necessary to maintain each bearing retainer segment 26 in proper position as shown. Although each retainer segment 26 is pivotable with respect to its mounting rivet 33, nevertheless, once the bearing seat segment 30 centers itself relative to the spherical bearing 20, there is no tendency to pivot about the rivet 33 since engagement of seat segment 30 with bearing 20 prevents such pivoting.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. A bearing assembly comprising, a bracket defining a spherical-bearing seat therein, a spherical bearing positioned in said bearing seat, a plurality of bearing-retainer members each pivotally secured to said bracket at a single point, each retaining member extending from its single point of securement toward the axis of said bearing seat, the extended end of each said retainer member defining an arcuate segment of a spherical-bearing seat of an arcuate length less than 180°, each arcuate segment of spherical-bearing seat being positioned to engage said spherical bearing on opposite sides of a plane formed by the axis of said bearing and the point of securement of the retaining member to said bracket, said plurality of retaining members cooperating to define a segmented spherical-bearing seat oppositely facing the spherical-bearing seat in said bracket, the segments of said segmented bearing seat being spaced from each other, and each segment of said segmented spherical-bearing seat being pivotally secured to said bracket independently of the other segments of said segmented bearing seat, thereby permitting independent bearing retention forces to be developed between each retaining member and said spherical bearing.

2. A bearing assembly comprising a bracket defining a spherical-bearing seat therein, a spherical bearing positioned in said bearing seat, a plurality of bearing-retainer members each secured to said bracket at a single point, each retaining member extending from its single point of securement toward the axis of said bearing seat, the extended end of each of said retainer member defining an arcuate segment of a spherical-bearing seat of an arcuate length less than 180°, each arcuate segment of spherical-bearing seat being positioned to engage said spherical bearing on opposite sides of a plane formed by the axis of said bearing and the point of securement of the retaining member to said bracket, said plurality of retaining members cooperating to define a segmented spherical-bearing seat oppositely facing the spherical-bearing seat in said bracket, the segments of said segmented bearing seat being spaced from each other, each segment of said segmented spherical-bearing seat being secured to said bracket independently of the other segments of said segmented bearing seat, thereby permitting independent bearing retention forces to be developed between each retaining member and said spherical bearing, an oil bearing felt overlying said bearing retainer members, and means in engagement with said oil bearing felt for forcing said oil bearing felt into oil delivering engagement with portions of said spherical bearing assembly.

3. A bearing assembly comprising a bracket defining a spherical-bearing seat therein, a spherical bearing positioned in said bearing seat, and having a tubular portion thereon extending from said spherical bearing in a direction away from said bearing seat, a plurality of bearing-retainer members each secured to said bracket at a single point, each retaining member extending from its single point of securement toward the axis of said bearing seat, the extended end of each said retainer member defining an arcuate segment of a spherical-bearing seat of an arcuate length less than 180°, each arcuate segment of spherical-bearing seat being positioned to engage said spherical bearing on opposite sides of a plane formed by the axis of said bearing and the point of securement of the retaining member to said bracket, said plurality of retaining members cooperating to define a segmented spherical-bearing seat oppositely facing the spherical-bearing seat in said bracket, the segments of said segmented bearing seat being spaced from each other, each segment of said segmented spherical-bearing seat being secured to said bracket independently of the other segments of said segmented bearing seat, thereby permitting independent bearing retention forces to be developed between each retaining member and said spherical bearing, an oil bearing felt having an aperture therethrough to accommodate said tubular portion of the spherical bearing extending therethrough, and means frictionally carried by and retained in position on said tubular extension from said spherical bearing for engaging said oil bearing felt and for forcing said oil bearing felt into oil delivering engagement with portions of said spherical bearing assembly.

4. In a bearing assembly comprising a frame member having a spherical-bearing seat formed therein, a spherical bearing positioned in said spherical-bearing seat, and a bearing-retainer carried by said frame member; the improvement wherein said bearing-retainer is segmented and defines a segmented bearing-retaining spherical-bearing seat, each bearing-retainer segment being completely separated from and independent of and spaced from the other bearing retainer segments, each bearing retainer segment being individually secured to said frame member at a single point, each bearing-retainer segment being pivotally mounted at its point of connection to said frame member, to permit relocation of the axis of the spherical-bearing seat segments relative to the axis of the spherical bearing, and the points of attachment of said bearing-retainer segments to said frame member lying in a plane spaced between opposed spherical-bearing seats formed on said bearing retainer and said frame member.

5. In a bearing assembly comprising a frame member having a spherical-bearing seat formed therein, a spherical bearing positioned in said spherical-bearing seat, and a bearing-retainer carried by said frame member; the improvement wherein said bearing-retainer is segmented and defines a segmented bearing-retaining spherical-bearing seat, each bearing-retainer segment being independent of and spaced from the other bearing retainer segments, each bearing-retainer segment being individually secured to said frame member at a single point, each bearing-retainer segment being pivotally mounted at its point of connection to said frame member, to permit relocation of the axis of the spherical-bearing seat segments relative to the axis of the spherical bearing, and each bearing-retainer segment defining an arcuate segment of a spherical-bearing seat of an arcuate length less than 180°.

6. In a bearing assembly comprising a frame member having a spherical-bearing seat formed therein, a spherical bearing positioned in said spherical-bearing seat, and a bearing-retainer carried by said frame member; the improvement wherein said bearing-retainer is segmented and defines a segmented bearing-retaining spherical-bearing seat, each bearing-retainer segment being completely separated from and independent of the other bearing-retainer segments, each bearing-retainer segment being individually secured to said frame member at a single point, and each bearing-retainer segment being pivotly mounted at its point of connection to said frame member, to permit relocation of the axis of the spherical-bearing seat segments relative to the axis of the spherical bearing.

References Cited in the file of this patent

UNITED STATES PATENTS

| | | |
|---|---|---|
| 1,974,691 | Redmond | Sept. 25, 1934 |
| 1,978,484 | Aufiero | Oct. 30, 1934 |
| 2,030,193 | Arnold | Feb. 11, 1936 |